US009573762B2

(12) United States Patent
Strybos

(10) Patent No.: US 9,573,762 B2
(45) Date of Patent: Feb. 21, 2017

(54) CAVERN PRESSURE MANAGEMENT

(71) Applicant: Air Liquide Large Industries U.S. LP, Houston, TX (US)

(72) Inventor: Ronald Strybos, Kountze, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 0 days.

(21) Appl. No.: 14/732,124

(22) Filed: Jun. 5, 2015

(65) Prior Publication Data

US 2016/0355341 A1    Dec. 8, 2016

(51) Int. Cl.
    *B65G 5/00*        (2006.01)
(52) U.S. Cl.
    CPC ............... *B65G 5/00* (2013.01); *B65G 5/005* (2013.01)
(58) Field of Classification Search
    CPC .......... B65G 5/00; F17C 1/007; F17C 13/025; F17C 2221/012; F17C 2250/0434; F17C 2270/0152; Y02E 60/322
    See application file for complete search history.

(56) References Cited

U.S. PATENT DOCUMENTS

| | | |
|---|---|---|
| 1,923,896 A | 8/1933 | Trump |
| 2,009,534 A | 7/1935 | Trump |
| 2,073,053 A | 3/1937 | Ducommun et al. |
| 2,229,140 A | 1/1941 | Smith et al. |
| 2,284,869 A | 6/1942 | Hinderliter |
| 2,346,392 A | 4/1944 | Protin et al. |
| 2,402,862 A | 6/1946 | Wright |
| 2,787,455 A | 4/1957 | Knappen |
| 2,878,165 A | 3/1959 | Cottle |
| 3,056,265 A | 10/1962 | Swinney |
| 3,148,000 A | 9/1964 | Dahms et al. |
| 3,289,609 A | 12/1966 | Palo |
| 3,438,203 A | 4/1969 | Lamb et al. |
| 3,807,181 A | 4/1974 | Kuhne |
| 3,848,427 A | 11/1974 | Loofbourow |
| 4,342,911 A | 8/1982 | French |
| 4,365,978 A | 12/1982 | Scott |
| 4,377,397 A | 3/1983 | Clements |
| 4,422,859 A | 12/1983 | McGee |
| 4,538,414 A | 9/1985 | Saleh |
| 4,592,677 A | 6/1986 | Washer |
| 4,616,669 A | 10/1986 | Washer et al. |
| 4,632,601 A | 12/1986 | Kuwada |
| 4,720,995 A | 1/1988 | Thiel |
| 4,789,101 A | 12/1988 | Kempf |
| 4,919,822 A | 4/1990 | Boulanger |
| 5,207,530 A | 5/1993 | Brooks et al. |
| 5,246,273 A | 9/1993 | Rosar |
| 5,333,465 A | 8/1994 | McBride |
| 5,336,083 A | 8/1994 | Rajewski |
| 5,394,943 A | 3/1995 | Harrington |
| 5,431,482 A | 7/1995 | Russo |
| 5,486,811 A | 1/1996 | Wehrle et al. |
| 5,496,893 A | 3/1996 | Gagne et al. |
| 5,511,905 A | 4/1996 | Bishop et al. |
| 5,957,539 A | 9/1999 | Durup et al. |
| 6,412,508 B1 | 7/2002 | Swann |
| 6,527,002 B1 | 3/2003 | Szakaly |
| 6,579,454 B2 | 6/2003 | Kaske |
| 7,078,011 B2 | 7/2006 | Morrow et al. |
| 7,097,386 B2 | 8/2006 | Maduell et al. |
| 7,152,675 B2 | 12/2006 | Heard |
| 7,905,251 B2 | 3/2011 | Flanders |
| 8,002,498 B2 | 8/2011 | Leone et al. |
| 8,690,476 B2 | 4/2014 | Oates |
| 8,757,926 B2 | 6/2014 | Drnevich |
| 8,814,133 B2 | 8/2014 | Li et al. |
| 2002/0174895 A1 | 11/2002 | Hill et al. |
| 2003/0025381 A1 | 2/2003 | Pickren |
| 2004/0136784 A1 | 7/2004 | Dahlem et al. |
| 2004/0238081 A1 | 12/2004 | Yoshinaga et al. |
| 2005/0205262 A1 | 9/2005 | Reimert et al. |

(Continued)

FOREIGN PATENT DOCUMENTS

| | | |
|---|---|---|
| DE | 101 17 617 | 10/2002 |
| EP | 0 086 506 | 8/1983 |
| GB | 2 460 550 | 12/2009 |
| WO | WO 2012 078780 | 6/2012 |
| WO | WO 2013 173709 | 11/2013 |

OTHER PUBLICATIONS

Electric Power Research Institute, "Carbon Steel Handbook," Mar. 2007, 172 pgs.
Flowserve, "Forged Steel ASMT A350 Grade LF2 Valves," webpage, 2009, 2 pgs.
Fomas Group, "Oil and Gas," 2015, 24 pgs.
Welker Engineering, "Particular Material Appraisal Grade LF2 Class 1 According to ASME SA-350," Jun. 2, 2004, 3 pgs.
International Search Report and Written Opinion for related PCT/US2015/029646, Oct. 16, 2015.
Barron, T.F., "Regulatory, technical pressures prompt more U.S. salt-cavern gas storage," Oil and Gas Journal, Pennwell, Houston, TX, US, vol. 92, No. 37, Sep. 12, 1994, 55-67.
Pottier, J.D. et al., "Mass storage of hydrogen," Proceedings of the NATO Advanced Study Institute series, Series E, Applied Sciences; Hydrogen Energy System: Production and Utilization of Hydrogen and Future Aspects, vol. 295, Jan. 1, 1995, 167-179.
International Search Report and Written Opinion for related PCT/US2015/029400, Jul. 21, 2015.
International Search Report and Written Opinion for related PCT/US2015/029662, Jul. 29, 2015.

(Continued)

*Primary Examiner* — Benjamin Fiorello
*Assistant Examiner* — Carib Oquendo
(74) *Attorney, Agent, or Firm* — Elwood L. Haynes

(57) ABSTRACT

A cavern pressure control method includes storing compressible and possibly incompressible fluids in an underground storage volume, removing a portion or introducing additional incompressible fluid into the underground storage volume, possibly removing a portion or introducing additional compressible fluid into the underground storage volume, thereby producing a net pressure increase rate ($P_{inc}$) within the underground storage volume, wherein $P_{inc}$ is maintained at less than a predetermined maximum increase value ($PI_{max}$).

7 Claims, No Drawings

(56) References Cited

U.S. PATENT DOCUMENTS

| | | |
|---|---|---|
| 2005/0220704 A1 | 10/2005 | Morrow et al. |
| 2006/0150640 A1 | 7/2006 | Bishop |
| 2008/0127654 A1 | 6/2008 | Darling et al. |
| 2008/0257542 A1 | 10/2008 | Brisco et al. |
| 2009/0010714 A1* | 1/2009 | Bishop .............. 405/53 |
| 2010/0276156 A1 | 11/2010 | Jennings |
| 2011/0100213 A1 | 5/2011 | Finkenrath et al. |
| 2011/0127825 A1 | 6/2011 | Hughes et al. |
| 2011/0305515 A1* | 12/2011 | Drnevich ............ 405/53 |
| 2012/0174569 A1* | 7/2012 | Ingersoll et al. ............ 60/327 |
| 2012/0325322 A1 | 12/2012 | Li et al. |
| 2013/0213479 A1 | 8/2013 | Oates et al. |
| 2013/0315669 A1 | 11/2013 | Oates |
| 2014/0241802 A1 | 8/2014 | Drnevich |
| 2015/0137578 A1 | 5/2015 | Colomé |

OTHER PUBLICATIONS

Berest, P., "International Gas Union Research Conference 2011: Thermomechanical aspects of high frequency cycling in salt storage caverns," 2011, 22 pgs.

Devries, K.L. et al., "Cavern roof stability for natural gas storage in bedded salt," Jun. 2005, 191 pgs. (cited in Office Action issued Oct. 10, 2014 for related U.S. Appl. No. 14/468,615).

International Search Report and Written Opinion for related PCT/US2015/035484, Feb. 11, 2016.

International Search Report and Written Opinion for related PCT/US2015/035491, Feb. 11, 2016.

International Search Report and Written Opinion for corresponding PCT/US2016/035646, Sep. 30, 2016.

International Search Report and Written Opinion for related PCT/US2016/035649, Sep. 30, 2016.

\* cited by examiner

CAVERN PRESSURE MANAGEMENT

BACKGROUND

Hydrogen is commonly supplied to customers that are connected to a supplier's hydrogen pipeline system. Typically, the hydrogen is manufactured by steam methane reforming in which a hydrocarbon such as methane and steam are reacted at high temperature in order to produce a synthesis gas containing hydrogen and carbon monoxide. Hydrogen may then be separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream.

Typically, hydrogen is supplied to customers under agreements that require availability and reliability for the steam methane reformer or hydrogen recovery plant. When a steam methane reformer is taken off-line for unplanned or extended maintenance, the result could be a violation of such agreements. Additionally, there are instances in which customer demand can exceed hydrogen production capacity of existing plants in the short term. Having a storage facility to supply back-up hydrogen to the pipeline supply is therefore desirable in connection with hydrogen pipeline operations.

Considering that hydrogen production plants on average have production capacities that are roughly 50 million standard cubic feet per day, a storage facility for hydrogen that would allow a plant to be taken off-line, to be effective, would need to have storage capacity in the order of 1 billion standard cubic feet or greater.

In order to provide this large storage capacity, high pressure gases, such as but not limited to nitrogen, air, carbon dioxide, hydrogen, helium, and argon, are stored in caverns, whether leached in salt formations or created by hard rock mining. A minimum volume of gas is stored in the cavern to provide adequate pressure to maintain the integrity of the cavern and prevent the cavern roof from collapsing and to keep the cavern walls from moving inward. This minimum volume of gas is called the pad gas or base gas. The amount of gas stored in addition to the pad gas or base gas volume is called the working gas or working inventory. Business opportunities can require removing more gas volume from the cavern than the working gas volume. To meet this business need, the volume of pad gas or base gas can be reduced to provide additional volume. For the purpose of this invention, the definition of high pressure is defined as a pressure at or above 10 atm. For the purpose of this invention, the definition of cavern integrity is defined as the ability of the cavern to hold static pressure when blocked in for 48 hours such that the cavern gas pressure does not decrease for 48 hours when all flows in and out of the cavern are stopped.

SUMMARY

In a first embodiment of the present invention, a method of pressure management in an underground storage volume is provided. This method includes storing a compressible fluid in an underground storage volume, and introducing additional compressible fluid into the underground storage volume, thereby producing a net pressure increase rate ($P_{inc}$) within the underground storage volume. $P_{inc}$ is maintained at less than a predetermined maximum increase value ($PI_{max}$).

In another embodiment of the current invention, the method includes storing a compressible fluid in an underground storage volume, storing an incompressible fluid in the underground storage volume, and introducing additional incompressible fluid into the underground storage volume, producing a net pressure increase rate ($P_{inc}$) within the underground storage volume, wherein $P_{inc}$ is maintained at less than a predetermined maximum increase value ($PI_{max}$).

Another embodiment of the current invention includes storing a compressible fluid in an underground storage volume, storing an incompressible fluid in the underground storage volume, introducing additional compressible fluid into the underground storage volume, and concurrently, removing a portion of the incompressible fluid from the underground storage volume, thereby producing a net pressure increase rate ($P_{inc}$) within the underground storage volume, wherein $P_{inc}$ is maintained at less than a predetermined maximum increase value ($PI_{max}$).

Another embodiment of the current invention includes storing a first compressible fluid in an underground storage volume, storing an incompressible fluid in the underground storage volume, removing a portion of the compressible fluid from the underground storage volume, and concurrently, introducing additional incompressible fluid into the underground storage volume, producing a net pressure increase rate ($P_{inc}$) within the underground storage volume, wherein $P_{inc}$ is maintained at less than a predetermined maximum increase value ($PI_{max}$).

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Leached caverns in salt formations are used to store liquids and gases at various pressures. It is found that rapid pressure movements cause failure of the salt cavern structure such as the cavern walls or roof. By limiting the rate of pressure increase or decrease, the cavern structure can be maintained.

Rapid pressure increase or decrease in a salt storage cavern are found to cause stress on the salt cavern walls, leading to wall collapse and roof collapse.

As used herein, the terms "net pressure increase rate" and net pressure decrease rate" are defined as the difference between two pressure measurements that have been made after a lapsed time of one hour. This is not to be interpreted as an "instantaneous" rate change, i.e. the difference between two pressure measurements that have been made over a very short span of time (e.g. after a lapsed time of less than one minute). Likewise, this is not to be interpreted as a rate change measured over a fraction of an hour, and then interpolated to fit the time span of an entire hour. This is the net pressure change observed between the span of one hour.

In a first embodiment of the present invention, a method of pressure management in an underground storage volume is provided. This method includes storing a compressible fluid in an underground storage volume, and introducing additional compressible fluid into the underground storage volume, thereby producing a net pressure increase rate ($P_{inc}$) within the underground storage volume. $P_{inc}$ is maintained at less than a predetermined maximum increase value ($PI_{max}$).

Another embodiment of the current invention includes storing a compressible fluid in an underground storage volume, and removing a portion of the compressible fluid into the underground storage volume, thereby producing a net pressure decrease rate ($P_{dec}$) within the underground storage volume, wherein $P_{dec}$ is maintained at less than a predetermined maximum decrease value ($PD_{max}$).

In another embodiment of the current invention, the method includes storing a compressible fluid in an underground storage volume, storing an incompressible fluid in the underground storage volume, and introducing additional incompressible fluid into the underground storage volume, producing a net pressure increase rate ($P_{inc}$) within the underground storage volume, wherein $P_{inc}$ is maintained at less than a predetermined maximum increase value ($PI_{max}$).

Another embodiment of the current invention includes storing a compressible fluid in an underground storage volume, storing an incompressible fluid in the underground storage volume, and removing a portion of the incompressible fluid from the underground storage volume, producing a net pressure decrease rate ($P_{dec}$) within the underground storage volume, wherein $P_{dec}$ is maintained at less than a predetermined maximum decrease value ($PD_{max}$).

Another embodiment of the current invention includes storing a compressible fluid in an underground storage volume, storing an incompressible fluid in the underground storage volume, introducing additional compressible fluid into the underground storage volume, and concurrently, removing a portion of the incompressible fluid from the underground storage volume, thereby producing a net pressure increase rate ($P_{inc}$) within the underground storage volume, wherein $P_{inc}$ is maintained at less than a predetermined maximum increase value ($PI_{max}$).

Another embodiment of the present invention includes storing a compressible fluid in an underground storage volume, storing an incompressible fluid in the underground storage volume, removing a portion of the compressible fluid from the underground storage volume, and concurrently, introducing additional incompressible fluid into the underground storage volume, thereby producing a net pressure decrease rate ($P_{dec}$) within the underground storage volume, wherein $P_{dec}$ is maintained at less than a predetermined maximum decrease value ($PD_{max}$).

Another embodiment of the current invention includes storing a first compressible fluid in an underground storage volume, storing an incompressible fluid in the underground storage volume, removing a portion of the compressible fluid from the underground storage volume, and concurrently, introducing additional incompressible fluid into the underground storage volume, producing a net pressure increase rate ($P_{inc}$) within the underground storage volume, wherein $P_{inc}$ is maintained at less than a predetermined maximum increase value ($PI_{max}$).

Another embodiment of the current invention includes storing a first compressible fluid in an underground storage volume, storing an incompressible fluid in the underground storage volume, introducing additional compressible fluid into the underground storage volume, and concurrently, removing a portion of the incompressible fluid from the underground storage volume, producing a net pressure decrease rate ($P_{dec}$) within the underground storage volume, wherein $P_{dec}$ is maintained at less than a predetermined maximum increase value ($PD_{max}$).

$PI_{max}$ may be 100 psi/hr. $PI_{max}$ may be 75 psi/hr. The underground storage volume may be an underground salt cavern. The compressible fluid may be selected from the group consisting of nitrogen, air, carbon dioxide, hydrogen, helium, and argon. The incompressible fluid may be selected from the group consisting of brine, water, or water slurry.

What is claimed is:

1. A method of pressure management in an underground storage volume, comprising:
   storing a compressible fluid in an underground storage volume,
   storing an incompressible fluid in said underground storage volume,
   and introducing additional compressible fluid into said underground storage volume, thereby producing a net pressure increase rate ($P_{inc}$) within said underground storage volume,
   wherein $P_{inc}$ is maintained at less than a predetermined maximum increase value ($PI_{max}$), wherein $PI_{max}$ is 100 psi/hr, wherein said compressible fluid is hydrogen.

2. The method of claim 1, wherein said underground storage volume is an underground salt cavern.

3. The method of claim 1, wherein said incompressible fluid is selected from the group consisting of brine, water, or water slurry.

4. The method of claim 1, wherein $PI_{max}$ is 75 psi/hr.

5. A method of pressure management in an underground storage volume, comprising:
   storing a compressible fluid in an underground storage volume,
   storing an incompressible fluid in said underground storage volume, and
   introducing additional incompressible fluid into said underground storage volume, producing a net pressure increase rate ($P_{inc}$) within said underground storage volume,
   wherein $P_{inc}$ is maintained at less than a predetermined maximum increase value ($PI_{max}$), wherein $PI_{max}$ is 100 psi/hr, wherein said compressible fluid is hydrogen.

6. A method of pressure management in an underground storage volume, comprising:
   storing a compressible fluid in an underground storage volume,
   storing an incompressible fluid in said underground storage volume, and
   introducing additional compressible fluid into said underground storage volume, and concurrently, removing a portion of said incompressible fluid from said underground storage volume, thereby producing a net pressure increase rate ($P_{inc}$) within said underground storage volume,
   wherein $P_{inc}$ is maintained at less than a predetermined maximum increase value ($PI_{max}$), wherein $PI_{max}$ is 100 psi/hr, wherein said compressible fluid is hydrogen.

7. A method of pressure management in an underground storage volume, comprising:
   storing a compressible fluid in an underground storage volume, storing an incompressible fluid in said underground storage volume, and removing a portion of said compressible fluid from said underground storage volume, and concurrently, introducing additional incompressible fluid into said underground storage volume, producing a net pressure increase rate ($P_{inc}$) within said underground storage volume, wherein $P_{inc}$ is maintained at less than a predetermined maximum increase value ($PI_{max}$), wherein $PI_{max}$ is 100 psi/hr, wherein said compressible fluid is hydrogen.

* * * * *